United States Patent
Rogers et al.

(10) Patent No.: US 12,031,659 B2
(45) Date of Patent: Jul. 9, 2024

(54) STABILIZER CARTRIDGE

(71) Applicant: Performance Pulsation Control, Inc., Richardson, TX (US)

(72) Inventors: John Thomas Rogers, Garland, TX (US); Stephen Michael Harold, Wylie, TX (US)

(73) Assignee: Performance Pulsation Control, Inc., Richardson, TX (US)

( * ) Notice: Subject to any disclaimer, the term of this patent is extended or adjusted under 35 U.S.C. 154(b) by 250 days.

(21) Appl. No.: 17/450,279

(22) Filed: Oct. 7, 2021

(65) Prior Publication Data

US 2022/0106947 A1 Apr. 7, 2022

Related U.S. Application Data

(60) Provisional application No. 63/198,273, filed on Oct. 7, 2020.

(51) Int. Cl.
*F16L 55/052* (2006.01)
*F04B 11/00* (2006.01)
*F16L 55/054* (2006.01)

(52) U.S. Cl.
CPC ........ *F16L 55/052* (2013.01); *F04B 11/0091* (2013.01); *F16L 55/054* (2013.01)

(58) Field of Classification Search
CPC ..... B65D 39/086; B65D 59/02; F04B 11/008; F15B 1/086; F15B 1/16; F15B 1/18; F15B 1/20; F15B 2201/20; F15B 2201/22; F15B 2201/30; F15B 2201/3154; F15B 2201/3156; F15B 2201/3157; F15B 2201/43; F15B 2201/435; F16F 9/0436; F16F 9/30; F16L 33/2071; F16L 33/30; F16L 55/005; F16L 55/0332; F16L 55/05; F16L 55/052; F16L 55/054; F16L 55/1108
USPC ....................................... 138/26, 28, 30, 110
See application file for complete search history.

(56) References Cited

U.S. PATENT DOCUMENTS

| | | | | |
|---|---|---|---|---|
| 1,824,342 A | * | 9/1931 | Seymour | F16L 55/053 138/30 |
| 2,342,355 A | * | 2/1944 | Mercier | F15B 1/08 220/721 |
| 2,448,118 A | * | 8/1948 | Pellettere | F16L 55/052 138/28 |
| 2,495,693 A | * | 1/1950 | Annis | F16L 55/052 138/30 |
| 2,530,190 A | * | 11/1950 | Carver | F16L 55/052 138/26 |

(Continued)

OTHER PUBLICATIONS

International Search Report and Written Opinion of the International Searching Authority dated Jan. 14, 2022, in connection with International Application No. PCT/US2021/054056, 9 pages.

*Primary Examiner* — David R Deal

(57) ABSTRACT

A cartridge shell for a suction or discharge stabilizer dampening pumped fluid pressure pulsations at an inlet or outlet of a reciprocating pump includes a head including a protrusion, an annular shell of deformable material of a deformable multi-ply material coupled to the protrusion, a plug coupled to the annular shell of deformable material at an opposite end of the annular shell of deformable material from the protrusion, and a cellular foam included within the interior of the annular shell of deformable material.

20 Claims, 5 Drawing Sheets

(56) References Cited

U.S. PATENT DOCUMENTS

| | | | | |
|---|---|---|---|---|
| 2,968,319 | A * | 1/1961 | Ball | F16L 55/053 |
| | | | | 138/30 |
| 3,212,602 | A * | 10/1965 | Strasser | F16L 55/02 |
| | | | | 367/1 |
| 3,376,898 | A * | 4/1968 | Hugley | F16J 3/02 |
| | | | | 138/30 |
| 3,486,530 | A * | 12/1969 | Mercier | F24D 3/1008 |
| | | | | 138/30 |
| 3,788,358 | A * | 1/1974 | Taki | F15B 1/14 |
| | | | | 138/30 |
| 4,122,969 | A * | 10/1978 | Hugley | B01J 3/03 |
| | | | | 220/316 |
| 4,243,073 | A * | 1/1981 | Hugley | F16L 11/083 |
| | | | | 138/30 |
| 4,345,624 | A * | 8/1982 | Rider | F16L 57/00 |
| | | | | 138/172 |
| 4,497,388 | A * | 2/1985 | Dexter | F16L 55/053 |
| | | | | 181/269 |
| 4,598,737 | A * | 7/1986 | Bentley | F16L 55/054 |
| | | | | 138/30 |
| 4,897,906 | A * | 2/1990 | Bartholomew | F16L 55/05 |
| | | | | 138/30 |
| 8,991,433 | B2 * | 3/2015 | Baseley | F15B 1/26 |
| | | | | 138/30 |
| 2014/0311603 | A1 * | 10/2014 | Baltes | F15B 1/04 |
| | | | | 138/30 |
| 2018/0038391 | A1 * | 2/2018 | Kloft | F15B 1/086 |
| 2019/0368513 | A1 | 12/2019 | Arikawa | |
| 2019/0390813 | A1 | 12/2019 | Rogers | |
| 2020/0032779 | A1 | 1/2020 | Rogers | |
| 2020/0109808 | A1 | 4/2020 | Mann | |
| 2020/0408347 | A1 | 12/2020 | Rogers | |

\* cited by examiner

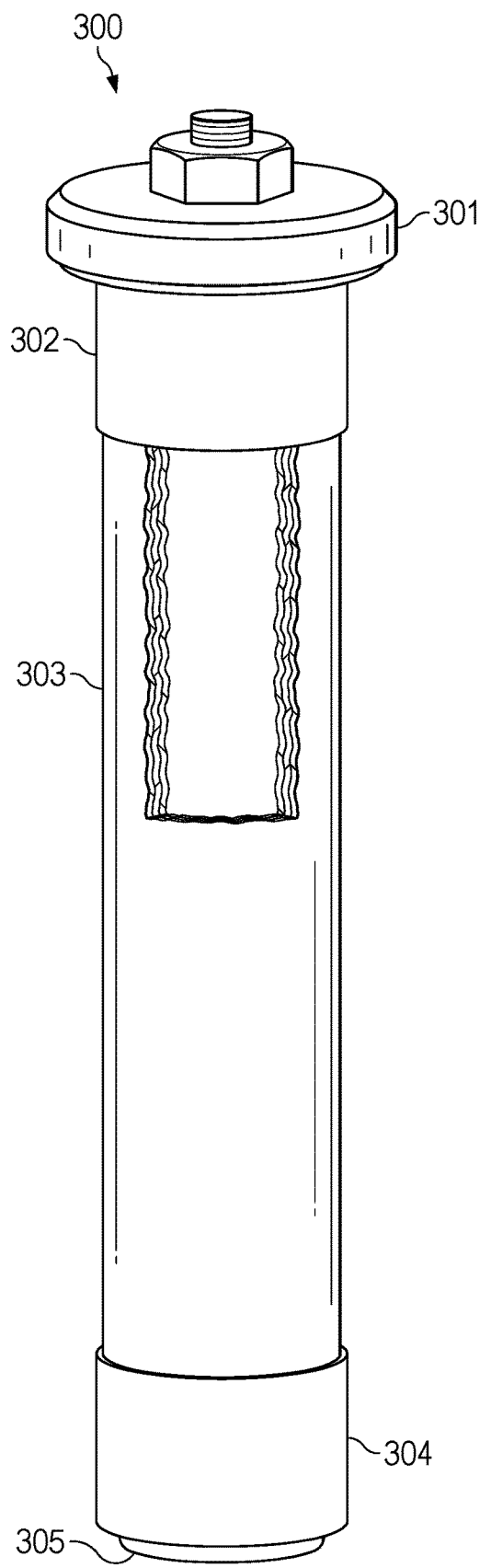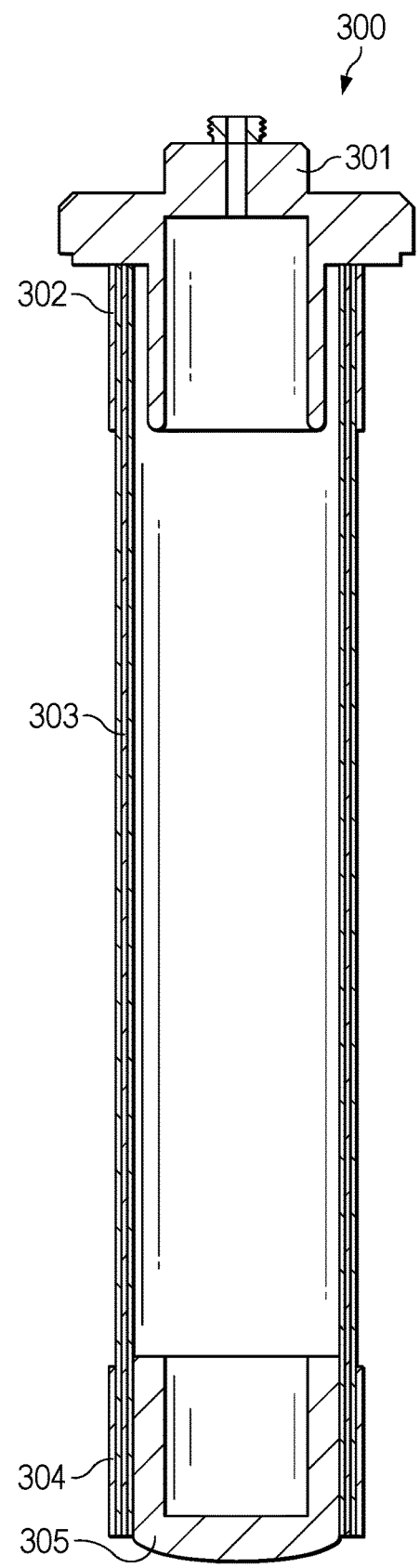
FIG. 3A
FIG. 3B

STABILIZER CARTRIDGE

CROSS-REFERENCE TO RELATED APPLICATION AND PRIORITY CLAIM

This application claims priority under 35 U.S.C. § 119(e) to U.S. Provisional Patent Application No. 63/198,273 filed on Oct. 7, 2020, which is hereby incorporated by reference in its entirety.

TECHNICAL FIELD

The present application relates generally to flow stabilizers and, more specifically, to the configuration of flow stabilizer cartridges.

BACKGROUND

Pulsation or cavitation is the change in fluid pressure within a closed system when caused by fluid velocity changes as the acceleration or deceleration (for example, by the pump), which all produce variations in fluid movement. Since fluid is not easily compressed, any force applied to pumped fluid can accrue and become sufficiently extreme to cause severe damage to the pump and/or the piping system connected to the pump. Flow stabilizers absorb these energy changes associated with a pump's reciprocating stroke. The design of stabilizer cartridges traditionally filled with a gas can be improved.

SUMMARY

A cartridge shell for a suction or discharge stabilizer dampening pumped fluid pressure pulsations at an inlet or outlet of a reciprocating pump includes a head including a protrusion, an annular shell of deformable multi-ply material coupled to the protrusion, a plug coupled to the annular shell of deformable material at an opposite end of the annular shell of deformable material from the protrusion, and a cellular foam included within the interior of the annular shell of deformable material.

In certain embodiments, the annular shell of deformable material includes an annular collar at the opposite end of the annular shell of deformable material, the annular collar including internal threads, and the plug is a threaded plug that coupled to annular shell of deformable material by the internal threads of the annular collar.

In certain embodiment, the head includes a threaded opening to allow access to the interior volume of the annular shell of deformable material for inserting the cellular foam. The stabilizer cartridge can further include a head plug with external threads to couple with the threaded opening of the head.

In certain embodiments, the stabilizer cartridge can include a perforated tube around the annular shell of deformable material, wherein the perforated tube is not affixed to the annular shell of deformable material or the head.

In certain embodiments, the stabilizer cartridge can further include a metal band clamped around an outside of the annular shell of deformable material at the opposite end of the annular shell of deformable material from the head, wherein the metal band restricts movement of the perforated tube while not being affixed to the perforated tube.

In certain embodiments, the deformable material is a multi-ply material.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; and the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 2 illustrates a stabilizer case with stabilizer cartridge installed and FIGS. 3A and 3B illustrate a current stabilizer cartridge filled with a gas;

DETAILED DESCRIPTION

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged pump discharge piping or system to control or partially control pulsation amplitudes.

Figure 1:
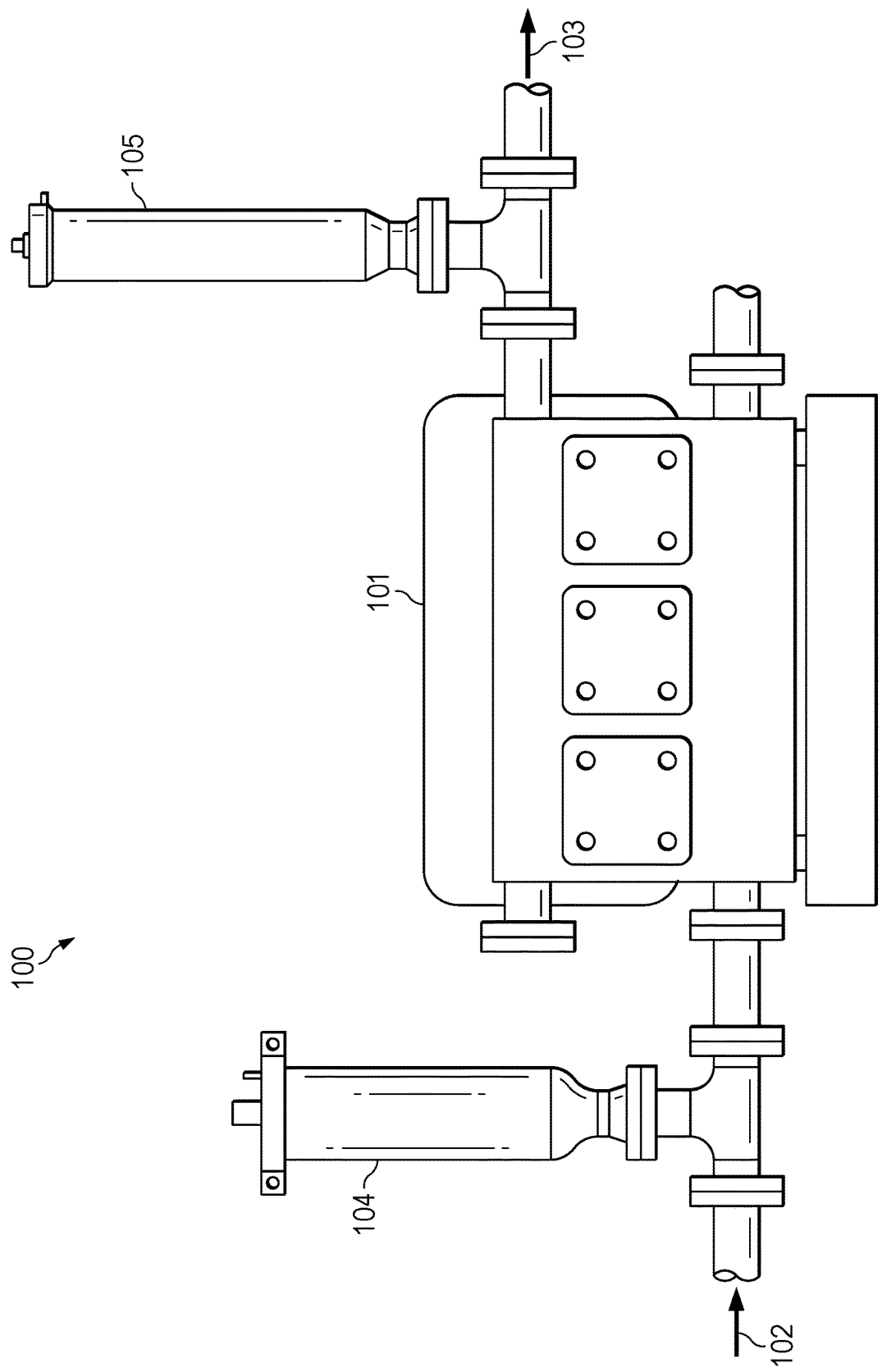
FIG. 1 illustrates a pump system in which a stabilizer cartridge in accordance with embodiments of the present disclosure may be employed.

FIG. 1 illustrates a pump system in which a stabilizer cartridge in accordance with embodiments of the present disclosure may be employed. Pump system 100 of FIG. 1 is merely exemplary, for purposes of explaining the principles of the present disclosure, and is not intended to be limiting.

Pump system 100 includes a three piston pump 101 receiving fluid 102 at an inlet through intake piping and discharging pumped fluid 103 through outlet piping. Connected to a T section within the inlet piping is a suction stabilizer 104; connected to a T section within the outlet piping is a discharge stabilizer 105.

Figure 2:
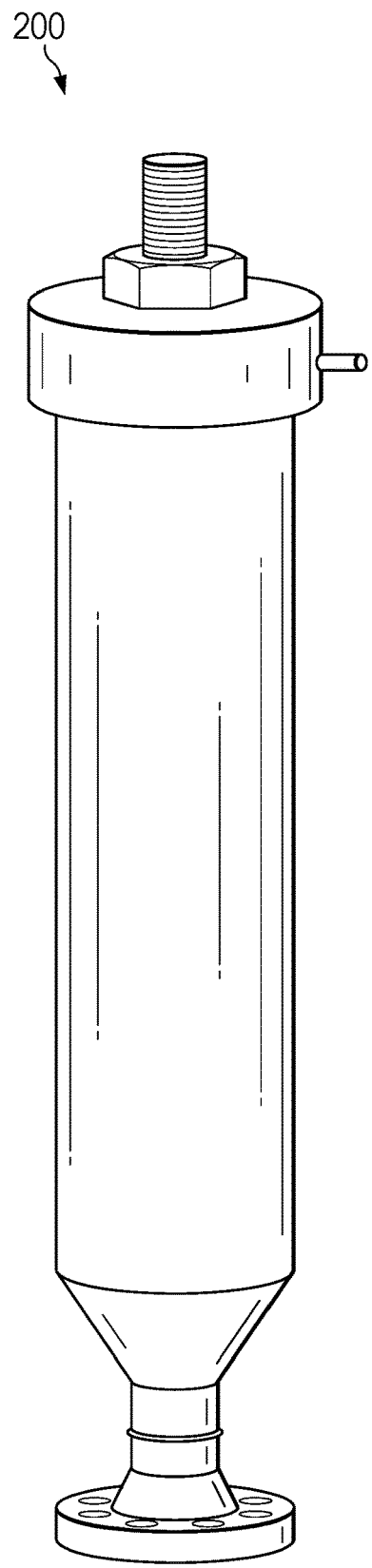

FIG. 2 illustrates a stabilizer case 200 and FIGS. 3A and 3B illustrate a stabilizer cartridge 300. FIG. 2 is a perspective view of the stabilizer case 200 with a stabilizer cartridge 300 installed.

The stabilizer case 200, includes a housing having a flange on the bottom for mounting on a T section of piping and receiving and discharging pumped fluid. In this type of cartridge, the top ring is externally threaded for securing a stabilizer cartridge. Optional features such as a bleeder valve may also be included.

The stabilizer cartridge 300 in the example of FIGS. 3A and 3B includes a head 301 having a threaded section received by the top ring of the stabilizer case 200 and a hex nut for facilitating securing and removing the stabilizer cartridge 300 from the stabilizer case 200. A metal clamp 302 secures an annular multi-ply, fiber-belted elastomer body 303 to a protrusion on the head 301. Another metal clamp 304 secures the body 303 to a plug 305. These type of current technology cartridges are filled with a gas.

Figure 4:
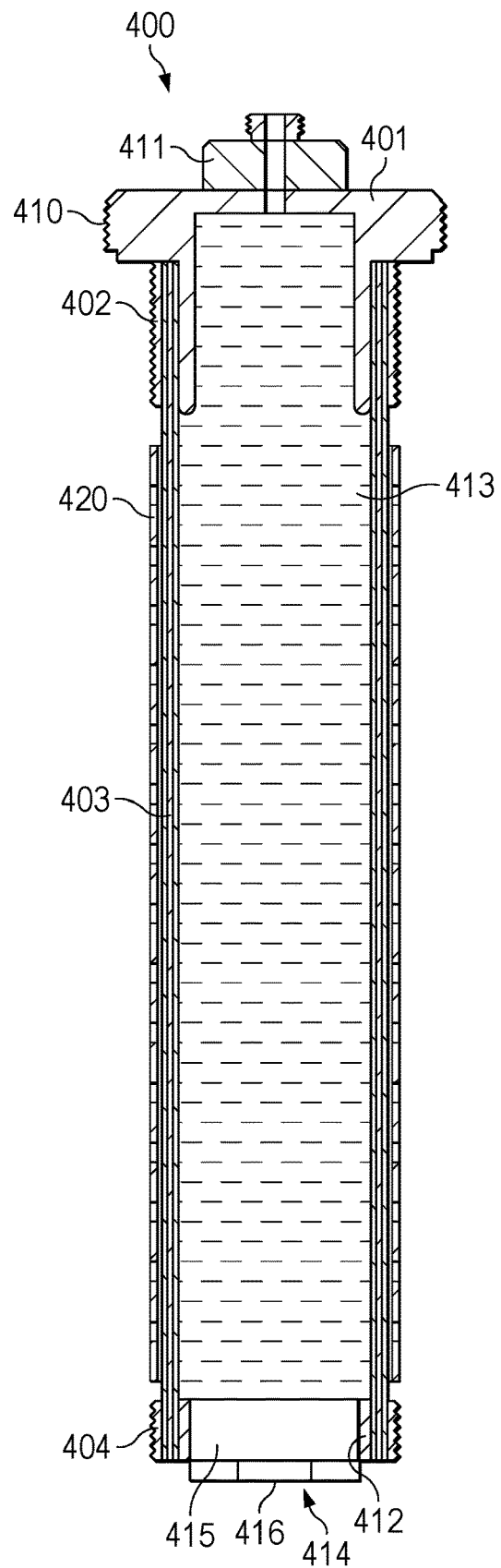
FIG. 4 illustrates a stabilizer cartridge in accordance with embodiments of the present disclosure may be employed.

FIG. 4 illustrates a stabilizer cartridge 400 in accordance with embodiments of the present disclosure may be employed. Stabilizer cartridge 400 of FIG. 4 is merely exemplary, for purposes of explaining the principles of the present disclosure, and is not intended to be limiting. FIG. 4 is a side cross-sectional view.

Stabilizer cartridge 400 includes a head 401 with a threaded exterior ring 410 received by threads in the stabilizer case 200 and a hex nut 411 for installing and removing the stabilizer cartridge 400. A stainless steel band 402 clamps one end of a multi-ply cartridge shell 403 to an annular protrusion on the cartridge head 401. The stabilizer cartridge 400 can further include a perforated tube 420 that surrounds the multi-ply cartridge shell 403. Another stainless steel band 404 clamps another end of the cartridge shell 403 to an annular collar 412 having internal threads. The stainless steel band 404 limits movement of the perforated tube 420 with the stainless steel band 402 in a manner that the perforated tube 420 is not affixed to any other component of the stabilizer cartridge 400. In other words, the perforated tube 420 is free floating around the multi-ply cartridge 403 between the stainless steel band 402 and the stainless steel band 404. The perforated tube 420 provides additional protection against a rupture of the annular shell, which could cause the internal cellular foam to exit out of the rupture reducing the pulsation reduction of stabilizer cartridge 400.

Instead of pressurized gas, the interior of at least the cartridge shell 403 and optionally also all or part of the annular protrusion on head 401 contains—and is optionally filled with—an elastomer gas infused or gas filled micro cellular foam 413. The elastomer gas infused or gas filled micro cellular foam 413 may be in the form of a sheet of cellular material rolled into a cylinder and place inside the stabilizer cartridge 400, or may be extruded into the interior of the cartridge shell 403. A plug 414 having a threaded portion 415 and a hexagonal nut 416 is screwed into the collar 412 to seal the enclosure formed by the head 401, cartridge shell 403, and collar 412. In one embodiment, the assembly may be placed into an oven or a steam heated autoclave, during the inner cellular material is cured by a process causing the blowing agent to activate, thus forming the gas filled micro cells.

The cellular material may not already be in a foam state before placed inside the cylinder. An elastomer compound in which a blowing agent is dispersed may be manipulated to create various precured shapes, such as by cutting the precured elastomer into sheets and then rolling a sheet into a tube, which is then installed inside a multi-ply skin 403. The plug 414 is threaded in and the assembled precured product is placed into a mold, which is then placed into either an oven or a steam autoclave to raise the temperature to the curing temperature and activate the blowing agent in order to form the gas filled micro cells (which is the cellular elastomer is in its final state). Alternatively, the precured elastomer may be stripped down enough to be fed into and thru an extruder, which pushes the material into the multi-ply shell, filling the inside.

In certain embodiments, the perforated tube 420 is a metal component that can withstand the various environmental factors of the closed pumping system. Environmental factors can include the high operating pressure, the corrosive nature of the fluid, the temperature of the fluid, and the like. For example, the perforated tube 420 is stainless steel, chrome, nickel, iron, copper, cobalt, molybdenum, tungsten, titanium, or the like. In another example, the perforated tube 420 has a coating that protects the material of the perforated tube 420 from environmental factors of the closed pumping system. The thickness of the perforated tube 420 is dependent on the material used and the pressure of the system and the pre-charge pressure of the cartridge.

The perforations of the perforated tube 420 are holes through the cylindrical sheet of metal. In certain embodiments, the perforations of the perforated tube 420 can be of the same size and the same shape. In certain embodiments, the perforations of the perforated tube 420 can be of different diameters or different shapes or both. For example, the perforations can be square, rectangular, circular, or triangular, and the like. In another example, the perforations can be different sizes. Each perforation can be a different size. A portion of the perforations can be a different size than other portions of the perforations. In certain embodiments, the perforations are evenly distributed along the perforated tube 420. In certain embodiments, the perforations are irregularly distributed along the perforated tube 420. In certain embodiments, there is a correlation between the size of the perforations, the thickness of the retaining sleeve, the type of material used for the retaining sleeve, the operating pressure of the system, the pre-charge pressure, and the like.

Figure 5:
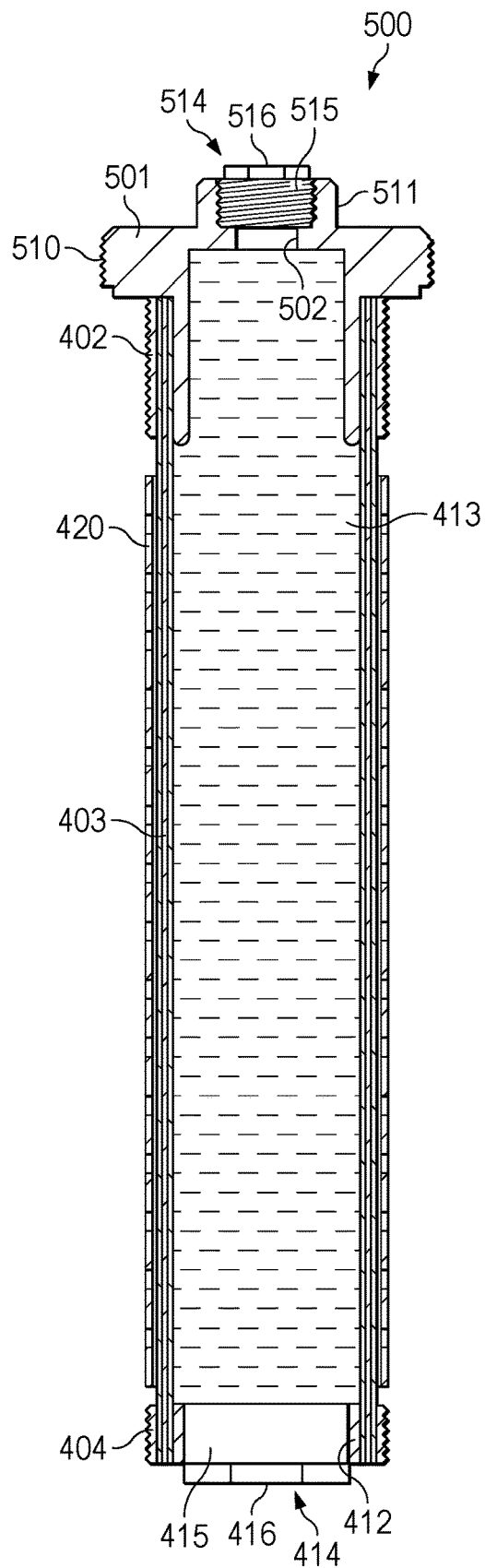
FIG. 5 illustrates a stabilizer cartridge in accordance with embodiments of the present disclosure may be employed.

FIG. 5 illustrates a stabilizer cartridge 500 in accordance with embodiments of the present disclosure may be employed. Stabilizer cartridge 500 of FIG. 5 is merely exemplary, for purposes of explaining the principles of the present disclosure, and is not intended to be limiting. FIG. 5 is a side cross-sectional view. The components 402-420 shown in FIG. 5 are the same as components 402-420 shown in FIG. 4 and their respective description are omitted from the description of FIG. 5 for simplicity.

Stabilizer cartridge 500 includes a head 501 with a threaded exterior ring 510 received by threads in the stabilizer case 200 and a hex nut 511 for installing and removing the stabilizer cartridge 500. The head 501 also includes internal an opening 502 with internal threads 515. A stainless steel band 402 clamps one end of a multi-ply cartridge shell 403 to an annular protrusion on the cartridge head 501. Instead of pressurized gas, the interior of at least the cartridge shell 403 and optionally also all or part of the annular protrusion on head 501 contains—and is optionally filled with—an elastomer gas infused or gas filled micro cellular foam 413. The elastomer gas infused or gas filled micro cellular foam 413 may be in the form of a sheet of cellular material rolled into a cylinder and place inside the stabilizer cartridge 500, or may be extruded into the interior of the cartridge shell 403 through opening 502 of the head 501. A plug 514 having a threaded portion and a hexagonal nut 516 is screwed into the interior of the hex nut 511 to seal the enclosure formed by the head 501, cartridge shell 403, and collar 412. In one embodiment, the assembly may be placed into an oven or a steam heated autoclave, during the inner cellular material is cured by a process causing the blowing agent to activate, thus forming the gas filled micro cells.

A cartridge shell for a suction or discharge stabilizer dampening pumped fluid pressure pulsations at an inlet or outlet of a reciprocating pump includes a head including a protrusion, an annular shell of a deformable multi-ply material coupled to the protrusion, a plug coupled to the annular shell of deformable material at an opposite end of the annular shell of deformable material from the protrusion, and a cellular foam included within the interior of the annular shell of deformable material.

In certain embodiments, the annular shell of deformable material includes an annular collar at the opposite end of the annular shell of deformable material, the annular collar including internal threads, and the plug is a threaded plug that coupled to annular shell of deformable material by the internal threads of the annular collar.

In certain embodiment, the head includes a threaded opening to allow access to the interior volume of the annular shell of deformable material for inserting the cellular foam. The stabilizer cartridge can further include a head plug with external threads to couple with the threaded opening of the head.

In certain embodiments, the stabilizer cartridge can include a perforated tube around the annular shell of deformable material, wherein the perforated tube is not affixed to the annular shell of deformable material or the head.

In certain embodiments, the stabilizer cartridge can further include a metal band clamped around an outside of the annular shell of deformable material at the opposite end of the annular shell of deformable material from the head, wherein the metal band restricts movement of the perforated tube while not being affixed to the perforated tube.

In certain embodiments, the deformable material is a multi-ply material.

Although the present disclosure has been described with exemplary embodiments, various changes and modifications may be suggested to one skilled in the art. It is intended that the present disclosure encompass such changes and modifications as fall within the scope of the appended claims.

What is claimed is:

1. A stabilizer cartridge, comprising:
a head including a protrusion extending from a first side of a disk and a hex nut on a second side of the disk;
an annular cartridge of deformable material into which the protrusion is inserted at a first end thereof, the annular cartridge clamped to the protrusion at the first end by a first clamp;
a plug inserted into the annular cartridge at second end thereof the annular cartridge clamped to the plug at the second end by a second clamp, wherein the protrusion, the plug, the first clamp, the second clamp, and an annular collar seal an interior volume of the annular cartridge; and
a cellular foam filling the interior volume of the annular cartridge.

2. The stabilizer cartridge of claim 1, wherein the annular cartridge includes internal threads at the second end, the plug is externally threaded, and the first and second clamps are externally threaded.

3. The stabilizer cartridge of claim 1, wherein the head includes a threaded opening to allow access to the interior volume of the annular cartridge.

4. The stabilizer cartridge of claim 3, wherein the hex nut includes the threaded opening.

5. The stabilizer cartridge of claim 1, further comprising:
a perforated tube around the annular cartridge, wherein the perforated tube is not affixed to the annular cartridge or the head.

6. The stabilizer cartridge of claim 5, wherein the second collar restricts movement of the perforated tube.

7. The stabilizer cartridge of claim 1, wherein the deformable material is a multi-ply material.

8. A pump system, comprising:
a pump; and
a stabilizer cartridge on an inlet of the pump, comprising:
a head including a protrusion extending from a first side of a disk and a hex nut on a second side of the disk;
an annular cartridge of deformable material into which the protrusion is inserted at a first end thereof, the annular cartridge clamped to the protrusion at the first end by a first clamp;
a plug inserted into the annular cartridge at second end thereof the annular cartridge clamped to the plug at the second end by a second clamp, wherein the protrusion, the plug, the first clamp, the second clamp, and an annular collar seal an interior volume of the annular cartridge; and
a cellular foam filling the interior volume of the annular cartridge.

9. The pump system of claim 8, wherein the annular cartridge includes internal threads at the second end, the plug is externally threaded, and the first and second clamps are externally threaded.

10. The pump system of claim 8, wherein the head includes a threaded opening to allow access to the interior volume of the annular cartridge.

11. The pump system of claim 10, wherein the hex nut includes the threaded opening.

12. The pump system of claim 8, further comprising:
a perforated tube around the annular cartridge, wherein the perforated tube is not affixed to the annular cartridge or the head.

13. The pump system of claim 12, wherein the second collar restricts movement of the perforated tube.

14. The pump system of claim 8, wherein the deformable material is a multi-ply material.

15. A pump system, comprising:
a pump; and
a stabilizer cartridge on an outlet of the pump, comprising:
a head including a protrusion extending from a first side of a disk and a hex nut on a second side of the disk;
an annular cartridge of deformable material into which the protrusion is inserted at a first end thereof, the annular cartridge clamped to the protrusion at the first end by a first clamp;
a plug inserted into the annular cartridge at second end thereof the annular cartridge clamped to the plug at the second end by a second clamp, wherein the protrusion, the plug, the first clamp, the second clamp, and an annular collar seal an interior volume of the annular cartridge; and
a cellular foam filling the interior volume of the annular cartridge.

16. The pump system of claim 15, wherein the annular cartridge includes internal threads at the second end, the plug is externally threaded, and the first and second clamps are externally threaded.

17. The pump system of claim 15, wherein the head includes a threaded opening to allow access to the interior volume of the annular cartridge.

18. The pump system of claim 17, wherein the hex nut includes the threaded opening.

19. The pump system of claim 15, further comprising:
a perforated tube around the annular cartridge, wherein the perforated tube is not affixed to the annular cartridge or the head.

20. The pump system of claim 19, wherein the second collar restricts movement of the perforated tube.

\* \* \* \* \*